United States Patent Office 3,461,330
Patented Aug. 12, 1969

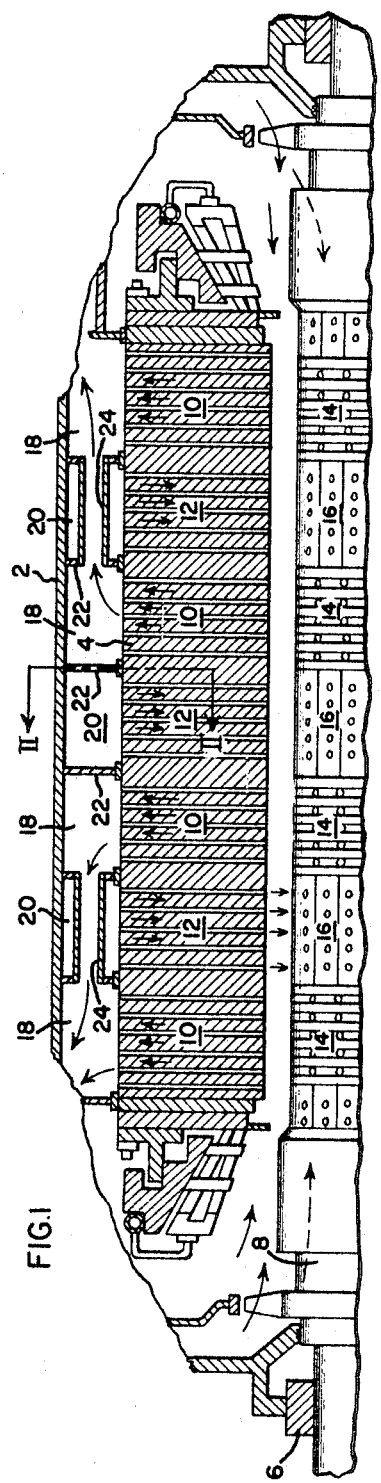

1

3,461,330
DYNAMOELECTRIC MACHINE STATOR
CORE BAFFLE
John G. MacDougal, Scotia, N.Y., assignor to General
Electric Company, a corporation of New York
Filed Dec. 21, 1967, Ser. No. 692,482
Int. Cl. H02k 9/16
U.S. Cl. 310—59                                     2 Claims

ABSTRACT OF THE DISCLOSURE

Dynamoelectric machine stator core baffle to seal coolant gas outlet sections from coolant gas inlet sections. Seal is effected by thermo-releasing rubber material sprung into sealing position by heat.

Background of the invention

This invention relates to an improvement in gas-cooled dynamoelectric machines and more particularly to gas-cooled machines of the type wherein coolant gas is motivated to flow radially through the stator core thereof.

In some types of dynamoelectric machines, such as generators, being currently used, cooling is effected in the rotor windings and in the stator core by gas which is motivated through the machine by means of rotor mounted fans and by the gap-pickup principle. Typically, the coolant gas is scooped into the rotor and motivated through stator core ducts. Radial ducts disposed in the stator core along its length are grouped therealong into inlet zones and outlet zones for better control of the flow of the cooled and heated gas.

Outboard of the generator core, these inlet and outlet zones are defined by the generator wrapper plate and by radial section plates extending between the wrapper plate and the proximity of the core. The present invention relates to an improved seal and method of sealing between the core and the section plates to provide better-defined flow paths and thus to provide improved gas flow characteristics through the inlet and outlet zones.

Accordingly, it is one object of the present invention to provide a generator stator with an improved sealing arrangement between its core laminations and its structural section plates.

Other objects, advantages and features of the present invention will become apparent from the following description when taken in connection with the accompanying drawing.

Summary of the invention

Briefly, the present invention is practiced by a radially extending baffle means disposed between core laminations and the radially extending section plates of a generator. The baffle means is made up of a rubbery extrusion having a radial flange which is set in a retracted position and held by a thermo-releasing material, such that when heated to a suitable temperature, the baffle flange springs into resilient or biasing contact against the core laminations to form a tight seal therewith.

Drawing

In the drawing:
FIG. 1 is a side sectional elevation of part of a gas-cooled generator, above its axis.
FIG. 2 is a partial sectional view taken along the lines II—II of FIG. 1 and showing a typical generator core without the present invention.
FIG. 3 is a view similar to FIG. 2 but including the present invention.
FIGS. 4, 5, 6 and 7 are sectional views of the baffle

2 member of the present invention and show progressive steps of its installation.

Description

Referring now to FIG. 1, part of a generator is shown in section and includes a casing or wrapper plate 2 supporting a laminated stator core 4 and bearings 6 which in turn rotatably support a rotor 8.

Stator core 4 is made up of stacked laminations of magnetic material, these laminations 40 defining radially extending gas coolant passages which are grouped in zones designated as outlet zones 10 and inlet zones 12. These outlet and inlet zones 10 and 12 correspond axially with outlet and inlet zones 14 and 16, respectively, situated along the rotor. Thus, in operation, gas discharged from rotor outlet zones 14 is motivated through stator outlet zones 10, and gas flowing radially inwardly through stator inlet zones 12 is scooped into the rotor at its inlet zones 16. The details of this gap-pickup principle are known and need not be further discussed here.

Radially outward of the stator core 4, the coolant gas discharges from outlet zones 10 into outlet sections 18, and gas flows into inlet zones 12 from inlet sections 20. These outlet and inlet sections 18 and 20 respectively are defined by the casing or wrapper plate, by the stator core 4, and by section plates 22 extending therebetween. The various inlet and outlet sections are not isolated but are incommunication with like sections at various positions around the circumference of the generator. This is shown, for example, by the cylindrical pipes 24 which connect outlet sections 18. In FIG. 2, there is shown a part of stator core 4 made up of its individual laminations 40. The laminations 40, as they are stacked, become collectively keyed to keybars 26 which extend axially along the length of the stator and are mounted upon a flange ring 28 which is in turn mounted on section plates 22. It will be apparent that between the stator laminations 40 and flange ring 28, there are a plurality of spaces 30 which permit to some extent communication between inlet and outlet sections 20 and 18.

Referring now to FIG. 3, baffle support plates 32 are mounted upon flange ring 28 and extend radially inwardly toward the stator core laminations to within less than an inch therefrom. These baffle support plates 32 are axially aligned with section plates 22 so as, in effects, to form inner extensions thereof. A resilient baffle strip member 34, which is typically an extruded shape, is mounted on each baffle support plate 32 and is resiliently biased against the stator core 4. Thus, the combination baffle support plate and baffle strip form a substantial partition between adjacent inlet and outlet sections.

For the details of the baffle strip member 34, reference will now be made to FIGS. 4, 5, 6 and 7. FIG. 4 shows one possible cross sectional shape of a resilient rubbery material for use as the baffle strip in the present invention. It will be apparent that many shapes can be used to perform the function of this member. The essential characteristics of the baffle strip are a means 38 to mount it on the baffle support plates 32 and a resilient flange 36 which can be retracted or biased in an extended direction. A typical material suitable for use as this baffle strip member 34 is BUNA "N" synthetic rubber.

FIG. 5 shows the same baffle strip 34 with its mounting flanges 38 and with its resilient flange or tab 36 in a retracted position. In this retracted position, tab 36 is cemented or tied or otherwise secured down with a thermo-releasing material. One such material is a thread of mono-filament polyethylene, stitched to the tab and body. In another form, the material could be a suitable cement.

In FIG. 6, the baffle strip member 34 is shown mounted on the radially inward edge of a baffle support plate 32.

Referring back to FIG. 3, baffle strips 34 are shown mounted on the radially inward edge of baffle support plate 32. In this position, and with the strips mounted on the plates in the retracted position shown in FIG. 6, there is radial clearance between the baffle strips 34 and the core laminations 40, so that the laminations may be installed without interference from the baffle strips.

Referring now to FIG. 7, when the stator laminations 40 are completely stacked, the entire structure is baked at a suitable temperature as, for example, 150° C., and during this process, the thermo-releasing material 42 which had held tab 36 in a retracted position, releases, allowing tab 36 to resiliently bias itself into contact with the stator core laminations 40 forming a seal therewith.

It will be apparent that an effective sealing baffle has been provided which separates the stator outlet sections from the stator inlet sections and thus provides an improved flow path for generator coolant gas.

It may occur to others of ordinary skill in the art to make modifications of the present invention which will remain within the concept and scope thereof and not constitute a departure therefrom. For example, the cross sectional shape of the baffle strip members 34 can be widely varied as hereinbefore mentioned. Furthermore, the materials of which the strip is made and the thermo-releasing material used for the retraction of tab member 36 might be any suitable material, the present invention not being limited to any particular materials. Accordingly, it is intended that the invention be not limited by the details in which it has been described but that it encompass all within the purview of the following claims.

What is claimed is:

1. A dynamoelectric machine stator having ventilating ducts emanating from its core and communicating with coolant gas inlet and outlet sections which are defined by a circumferential casing and section plates extending radially inward from said casing toward said core, wherein the improvement comprises:

gas flow baffles disposed in sealing relationship between said section plates and said core, each of said baffles including a resilient strip having a resilient flange, means to mount said resilient strip relative to said section plates, and means to release said resilient flange from a retracted position to an extended position biased against said core.

2. The improvement according to claim 1 in which said baffles are composed of an elastomeric substance, said mounting means comprises a pair of parallel mounting flanges on each baffle extending outwardly from said strip along opposite faces of a supporting plate which forms a part of each of said section plates, and said releasing means comprises a thermo-releasing agent actuable by a temperature increase to release said flange.

References Cited
UNITED STATES PATENTS

| | | | |
|---|---|---|---|
| 3,110,827 | 11/1963 | Baudry | 310—61 X |
| 3,348,081 | 10/1967 | Willyoung | 310—55 |
| 3,413,499 | 11/1968 | Barton | 310—58 |

MILTON O. HIRSHFIELD, Primary Examiner

D. F. DUGGAN, Assistant Examiner

U.S. Cl. X.R.

310—64